Aug. 16, 1949.    D. O. BRANT    2,478,893
APPARATUS FOR LIQUEFYING FROZEN FOOD PRODUCTS
Filed Nov. 26, 1945    2 Sheets-Sheet 1
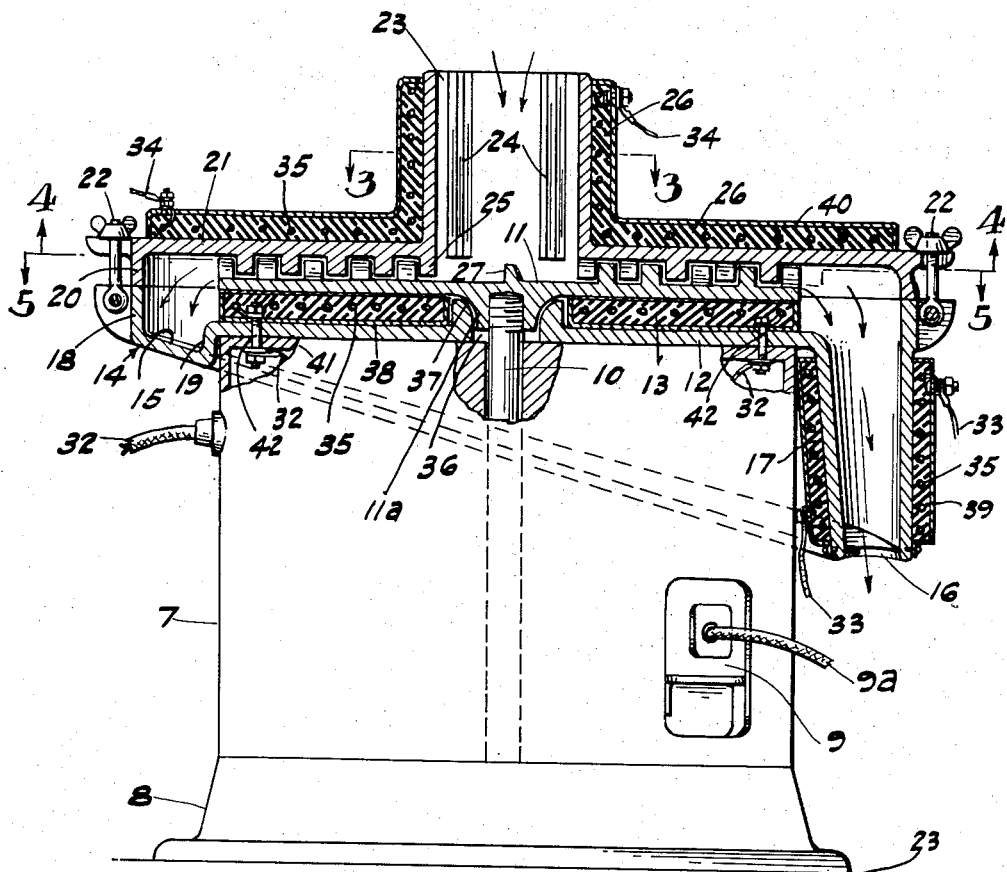
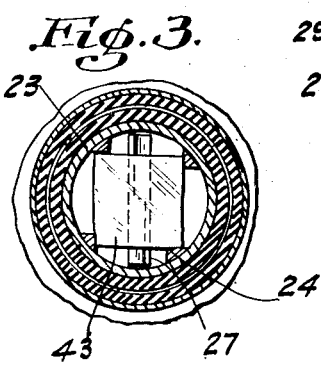
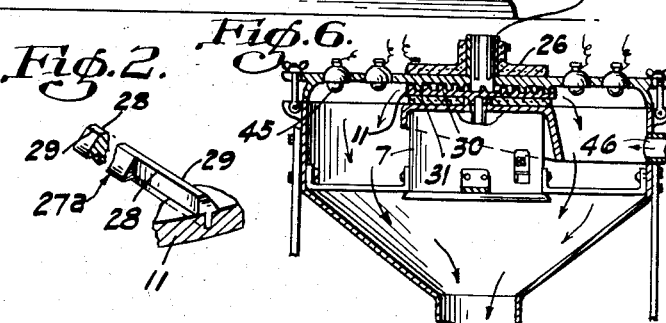
David O. Brant
INVENTOR.
BY
ATTORNEY.

Aug. 16, 1949.  D. O. BRANT  2,478,893
APPARATUS FOR LIQUEFYING FROZEN FOOD PRODUCTS
Filed Nov. 26, 1945  2 Sheets-Sheet 2
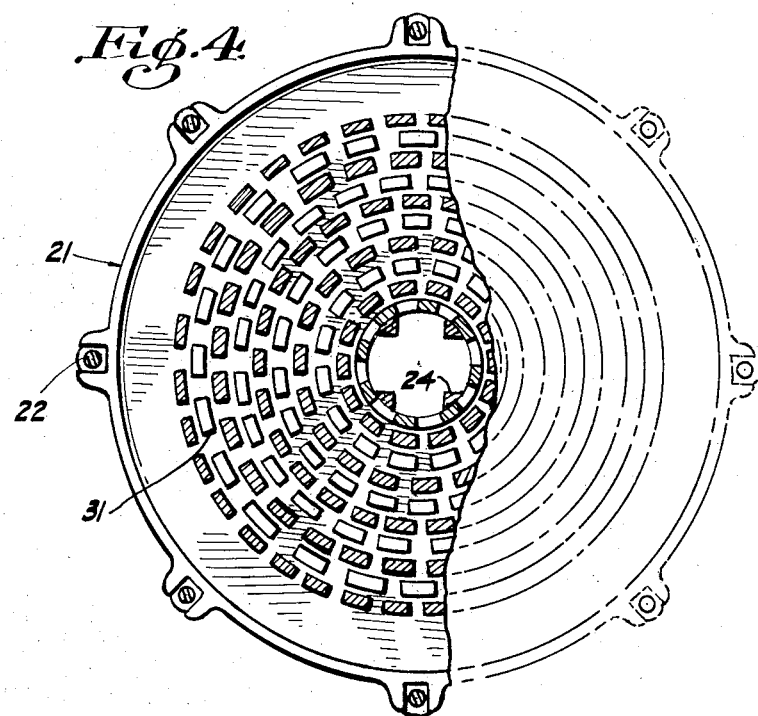
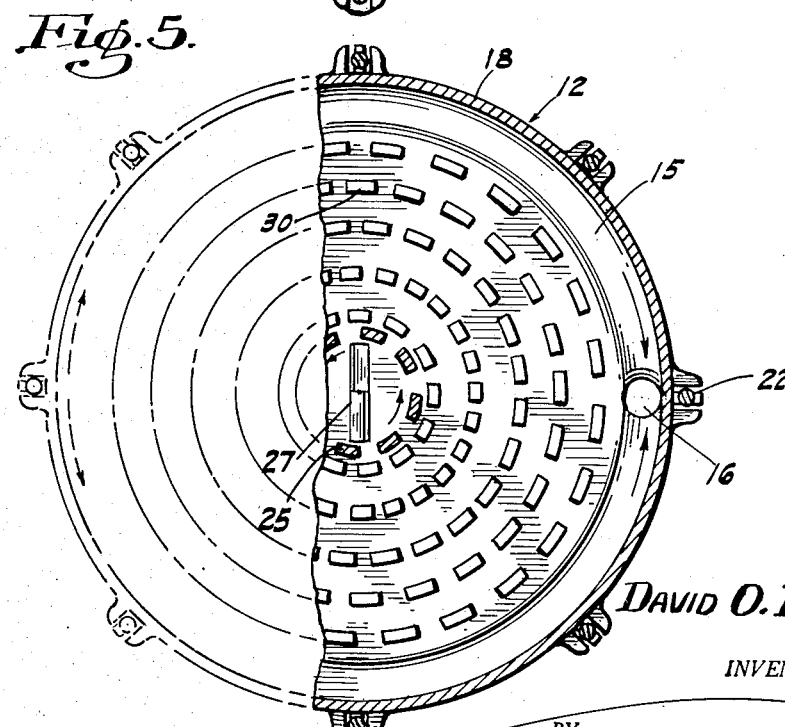
David O. Brant,
INVENTOR.

Patented Aug. 16, 1949

2,478,893

UNITED STATES PATENT OFFICE 2,478,893

APPARATUS FOR LIQUEFYING FROZEN FOOD PRODUCTS

David O. Brant, Beverly Hills, Calif.

Application November 26, 1945, Serial No. 630,832

14 Claims. (Cl. 241—65)

This invention relates to a method and apparatus for liquefying and/or dehydrating frozen food products.

It is well known that the expressed juice of fruit, such as orange juice and like juices, quickly changes in flavor and food values. Also that changes take place when the frozen products are held at above freezing temperatures for a time to permit them to thaw out. The time element alone, in order to produce the change from solid to liquid, prevents the serving of drinks produced by liquefication, immediately thereafter in such places as soda fountains and the like, even though the food and flavor change does not take place.

The desirability of a method whereby food products can be juiced, mixed and thoroughly homogenized to break down the pulp, globules and other constituents to thoroughly blend them and set free the hidden flavors, bouquets and aromas and then instantly trap and hold them indefinitely in frozen form until such time as it is desired to use the product is now being practiced through the use of my recent invention entitled Homogenizer, patented September 7, 1943; Pat. No. 2,328,950.

The advantage of instantly liquefying frozen substances produced by my homogenizer, so that the consumer will receive the product in the same condition as when it was previously juiced or mixed and frozen, (perhaps months before) must be evident to all.

To liquefy frozen substances whereby they may be instantly served while still possessing their original bouquet and palatability at temperatures ranging from cold to hot, or to dehydrate such liquefied substances using the same method and means combine to form objects which are paramount among the objects of the invention.

In order to achieve these paramount objects as well as other objects, I propose the use of a smaller individual homogenizer patterned somewhat along the general lines of my patented homogenizer with certain additional improvements which can be used at the fountains or places of consumption. The machine will be so constructed that the cubes of the frozen product or bricks, of predetermined size to fill a glass, can be run into the machine. Incident to running the product through the machine the various products or mixes may be retained in a cold locker.

Then when a customer orders, for example, a glass of fresh orange juice, the operator will simply remove from the locker a cube or brick and place it in the machine and the iced product will immediately flow from the machine as liquid, ready for consumption.

The teeth of the rotating disc or discs will tear the iced crystals asunder and, by the warming to the desired degree of the metal parts and the air passing through the machine will, due to the centrifugal action of the disc rotating, add enough heat to cause the substance to emerge in any desired condition, such as a thick product that can be eaten with a spoon, a cold liquid for immediate drinking, and/or when desired, by the application of sufficient heat to the machine, produce a hot liquid, such for example, coffee or soup.

The heat may be added in a number of different ways, such as by electric resistance coils, heat conductivity rubber which is made hot by an electric current, or by the circulation or warm or hot water, air or other fluid through parts of the machine surrounding the path through which the particles circulate during liquefaction.

The machine whereby these objects are achieved is disclosed in the accompanying drawings, wherein is shown what is at present deemed to be a preferred embodiment of the invention and, which is briefly described as follows:

Fig. 1 is a part sectional side elevation of the device.

Fig. 2 is a modified fragmentary perspective view per se of the ice breaker, a fragment of its support being included in the view.

Fig. 3 is a transverse section taken on line 3—3 of Fig. 1.

Figs. 4 and 5 are fragmentary sectional views taken respectively on lines 4—4 and 5—5 of Fig. 1.

Fig. 6 is a modified fragmentary elevational section.

Referring in detail to the drawings, the numeral 7 indicates a generally cylindrical casing or shell having a flared basal portion 8. A motor 9, energizable through the lead 9a communicating with a suitable source of power, is housed in said casing for rotating the shaft 10 upon which is mounted to rotate therewith a disk-like member 11. Said disk-like member is vertically spaced above the top of the casing a sufficient distance so as to interpose therebetween a stationary collector 12 and a heating element 13.

The collector 12 is provided with an annular sump 14 which has a transversely inclined floor 15, said floor also surrounding the casing as a whole at an inclination. At a point defined by the greatest depth of the sump is formed an outlet 16 at that side of the structure through which the substances from the machine emerge. Throughout the greater portion of the circumference of the casing said inclined sump is enveloped with a heating element 17 which, in cooperation with the heating element 13, progressively heats at will the substance being liquefied and/or dehydrated passing through the machine.

The sump 14 is shown having an outer upstanding annular flange 18 and an inner depending annular flange 19 joined by the aforesaid tapering floor portion 15, the flange 19 being spaced outwardly from the casing a sufficient distance throughout most of its circumference to provide space for the insertion of a portion of the heating element 17 therebetween.

The upwardly exposed edge of the flange 18 forms an annular seat upon which is mounted the downwardly depending annular flange 20 of the flat annular cover 21. The downwardly facing edge of the flange 20 and the upwardly facing edge of the flange 18 are machined so as to abut with exact nicety in order that when the collector 12 and cover 21 have been clamped together through the medium of the conventional circumferentially spaced swingable bolts 22, there will be no leak of the substances being liquefied.

It will be noted by reference to Fig. 1 that the meeting edges of the flanges 18 and 20 are substantially in horizontal alinement with the underside of the disk-like member 11 and that the upstanding flange 18 is in a concentric parallel spaced relation to the depending flange 19.

The cover 21 is provided with an upstanding cylindrical chute 23 preferably located in axial alinement with the shaft 10, said chute having a spacious opening through which the cubes of frozen substances are introduced to the machine. Circumferentially spaced, vertically extending ribs 24 are mounted in the inner periphery of the chute to aid in maintaining a hold on the cubes to prevent premature rotation while they are undergoing disintegration incident to passing through the machine.

The space within the chute and outside the cubes permits air to circulate through the machine and mix with the product being liquefied thus adding the heat of the air, also in aerating and foaming the product to improve its appearance and flavor.

The chute 23 projects past the flat bottom portion of the cover to within a working clearance of the member 11, said chute terminating at its lower end in a castellated flange 25 through which the disintegrated ice particles must pass after being crushed. Atop the cover 21 and surrounding the chute 23 is mounted another heating element 26.

The member 11 is provided with an ice breaker bar or blade 27 which may be constructed integral with the member as shown in Figs. 1 and 3, or detachably mounted upon the member 11 as indicated by the numeral 27a in the modified showing in Fig. 2. In both cases the blade is constructed with leading cutting edges 28 and trailing edges 29 which operates with a working clearance within the circular space defined by the inner periphery of the castellated flange 25.

The disk-like member 11 and central portion of the flat cover 21 cooperate to form a combination of paired disk-like members each of which are provided with a multiplicity of teeth on their adjacent faces, the numeral 30 indicating the teeth on the rotating member 11 and the numeral 31 indicating the teeth on the cover or stationary member 21. The teeth of each of said paired members are arranged in concentric rows, the teeth of each member projecting into spaces provided for them between the concentric rows of teeth of the other member, the teeth of each member being staggered circumferentially in adjacent rows. Figs. 4 and 5 show the complete arrangement of the teeth as they appear on the adjacent faces of the paired disks as well as their joint arrangement, so that it may be determined that there are no straight passages permitting the escape of uncrushed or unliquefied particles undergoing treatment.

The particles undergo liquefication due to their being battered and also to the mixing of the warm air drawn into the machine through the chute due to the centrifugal force coupled with the centrifuging of the mass passing through the machine. The liquefaction of the cubes of ice is augmented at will by the progressive addition of heat. This is accomplished by energizing any or all of the heating elements by closing a circuit to a suitable source of power through the conductors 32, 33 and 34.

The heating elements 13, 17 and 26 are shown preferably consisting of heat conductivity rubber which is made hot through the medium of the energized resistance coils 35 embedded therein.

Referring to certain details of construction, the collector 12 is provided with a central opening 36 and surrounding said opening is an annular flange 37 which is an integral part of the collector. Said flange is contoured to closely underlie the central hub portion 11a of the member 11 wherein is threaded the upper end of the shaft 10.

The heating elements 13, 17 and 26 are partially encased respectively within protective coverings 38, 39 and 40, the coverings 38 being secured to the casing top 41 by means of the conductor bolts 42 while the elements 17 and 26 may be secured to the adjacent metal by cementing or in any other suitable way.

In the operation of the machine each iced cube 43 (see Fig. 3) is introduced into the chute 23 and is downwardly fed against the ice crushing bar 27, being held against premature rotation of the ribs 24, where the crushing and shaving operation first takes place, after which the particles are forced through the openings between the inner teeth of the castellated flange 25. After being forced between said inner teeth further disintegration takes place until, by the time the fed material reaches the outermost row of teeth of the rotatable disc-member 11, said material has been reduced to a liquefied edible mass so fine that it may be considered mist or fog. This liquefaction of the mass is augmented by the entrainment of warm air through the feed chute 23 coupled with the warmth given to the mass from the heat radiated from the metal parts which in turn are warmed by the entrained air and energizing of the coils 16 embedded in the heat conductivity rubber.

It will be seen that considered as a method the first step in the preparation of the product from the frozen cubes, consists of coarsely comminuting the frozen subject. Thereafter the product is centrifuged either with or without the application of heat.

In the modified showing in Fig. 6, heating of the centrifuged mass after its discharge from between the homogenizing teeth 30 and 31 is accomplished by means of heat rays emitted from lamps 45, said rays preferably being of the infra red character and another additional feature shown in Fig. 6 is that the heating area is increased between the periphery of the rotating disk 11 and the outside of the casing to allow for greater heat penetration of the particles when undergoing dehydration. Also there is an outlet 46 connected to any suitable source of either hot or cold to aid in the further heating, chilling or liquefaction of the substance being treated in the processes of liquefication or dehydration.

What is claimed is:

1. In a machine of the kind described, an upstanding casing enclosing a motor surrounding a shaft for rotating the latter, a circular disk-like member mounted upon said shaft to rotate therewith, said disk-like member being vertically spaced above the top of said casing, a collector having a flat body portion which overlies said casing and occupies a position between the latter and said disk-like member, said collector being provided with an annular trough-like sump surrounding said flat body portion which has a floor that inclines downwardly from one side of the casing to the diametrically opposite side thereof and having an outlet at the point where said trough is deepest, said sump having a downwardly depending flange which overlies said casing and an upwardly directed flange in a concentric parallel spaced relation to said depending flange, a circular disk-like cover member having a downwardly depending flange which abuts and rests upon the upwardly directed flange of said sump, said disk-like member and said disk-like cover member comprising a combination of paired disk members each being provided with a multiplicity of teeth on their adjacent faces, the teeth of each of the latter members being arranged in concentric rows, the teeth of each member projecting into spaces provided for them between the concentric rows of teeth of the other member, the teeth of each member being staggered circumferentially in adjacent rows, a feed chute carried by said disk-like cover member, said feed chute having an opening located centrally of each of said paired members through which cubes of frozen food are introduced to the spaces between adjacent inner teeth, crushing means comprising a blade extending diametrically across and projecting upwardly into said chute carried by the rotating disk of said pair to subdivide the cubes into particles of a size to pass between the teeth of concentric rows for still further disintegration and liquescency, and stationary insulated electrical heating means carried by the machine to progressively heat the disintegrated particles on their passage through the machine.

2. The subject matter of claim 1 and, said heating means underlying said disk-like member and throughout the greater portion of the circumference of the casing enveloping said inclined sump.

3. The subject matter of claim 1 and, said chute being provided with means on its inner periphery to hold the material fed through the chute from being prematurely rotated by said crushing means, the first said means comprising circumferentially spaced, vertically extending ribs having shoulders to engage the corner portions of the cubes to prevent their rotation while being disintegrated by the shearing action of the cutting edge of said blade in contact with the cube's lower face.

4. In a machine of the kind described, an upstanding casing enclosing a motor surrounding a shaft for rotating the latter, a circular disk-like member mounted upon said shaft to rotate therewith, said disk-like member being vertically spaced above the top of said casing, a collector having a flat body portion which overlies said casing and occupies a position between the latter and said disk-like member, said collector being provided with an annular trough-like sump surrounding said flat body portion which has a floor that inclines downwardly from one side of the casing to the diametrically opposite side thereof and having an outlet at the point where said trough is deepest, said sump having a downwardly depending flange which overlies said casing and an upwardly directed flange in a concentric parallel spaced relation to said depending flange, a circular disk-like cover member having a downwardly depending flange which abuts and rests upon the upwardly directed flange of said sump, said disk-like member and said disk-like cover member comprising a combination of paired disk members each being provided with a multiplicity of teeth on their adjacent faces, the teeth of each of the latter members being arranged in concentric rows, the teeth of each member projecting into spaces provided for them between the concentric rows of teeth of the other member, the teeth of each member being staggered circumferentially in adjacent rows, a tubular feed chute carried by said disk-like cover member the lower end of which terminates in a castellated flange, said chute having an opening located centrally of each of said paired members through which cubes of frozen food are introduced to the spaces between adjacent inner teeth, and crushing means extending diametrically across and projecting upwardly into said chute carried by the rotating disk of said pair to subdivide the cubes into particles of a size to pass through the openings in said castellated flange incident to their passage between the teeth of concentric rows for still further disintegration and liquefication.

5. In a machine of the kind described, an upstanding casing enclosing a motor surrounding a shaft for rotating the latter, a circular disk-like member mounted upon said shaft to rotate therewith, said disk-like member being vertically spaced above the top of said casing, a collector having a flat body portion which overlies said casing and occupies a position between the latter and said disk-like member, said collector being provided with an annular trough-like sump surrounding said flat body portion which has a floor that inclines downwardly from one side of the casing to the diametrically opposite side thereof and having an outlet at the point where said trough is deepest, said sump having a downwardly depending flange which overlies said casing and an upwardly directed flange in a concentric parallel spaced relation to said depending flange, a circular disk-like cover member having a downwardly depending flange which abuts and rests upon the upwardly directed flange of said sump, said disk-like member and said disk-like cover member comprising a combination of paired disk members each being provided with a multiplicity of teeth on there adjacent faces, the teeth of each of the latter members being arranged in concentric rows, the teeth of each member projecting into spaces provided for them between the concentric rows of teeth of the other member, the teeth of each member being staggered circumferentially in adjacent rows, and a feed chute carried by said disk-like cover member, said chute having an opening located centrally of each of said paired members through which cubes of frozen food are introduced to the spaces between adjacent inner teeth, said chute having square shouldered ribs to engage the corner portions of cubes to restrict their rotation while being fed therethrough.

6. In a machine of the kind described, an upstanding casing inclosing a motor and surrounding a shaft for rotating the latter, a circular disk-like member mounted upon said shaft to rotate therewith, a collector having a flat central portion which overlies said casing and occupies a position between the latter and said disk-like member, said collector having an annular sump therearound, said sump increasing in depth from one side of said casing to the diametrically opposite side thereof where it is provided with an outlet, said sump having an outer upstanding flange and an inner concentric depending flange, said outer flange having a flat horizontal top surface, a disk-like cover member provided with an annular depending flange having a horizontal flat bottom surface to mate with and be supported by the flat upper face of said upstanding flange, means to detachably clamp together said cover and collector, said cover being provided with an upstanding cylindrically shaped central chute wherethrough to introduce frozen cubes of ice to the machine, said chute terminating at its lower end in a castellated flange through the openings of which the disintegrated ice particles pass after being crushed, an ice crusher blade carried by the first said disk within the circular space defined by the inner periphery of said chute, said blade being constructed with leading cutting and trailing edges which operate with a working clearance within the circular space defined by the inner periphery of said castellated flange, and means carried by the inner periphery of said chute and cooperating with said blade to crush the ice incident to its passing into the machine, each of said members being provided with a multiplicity of teeth on their adjacent faces, the teeth of each of said members being arranged in concentric circular rows, the teeth of each of said members projecting into spaces provided for them between concentric rows of teeth of the other member, the teeth of each member being staggered circumferentially in adjacent rows.

7. The subject matter of claim 6, and stationary insulated electrical means carried by the machine to progressively heat the substance passing through the machine in order to aid in the liquification of said substance.

8. In a machine of the kind described, an upstanding casing inclosing a motor and surrounding a shaft for rotating the latter, a circular disk-like member mounted upon said shaft to rotate therewith, a collector having a flat central portion which overlies said casing and occupies a position between the latter and said disk-like member, said collector having an annular sump therearound, said sump increasing in depth from one side of said casing to the diametrically opposite side thereof where it is provided with an outlet, said sump having an outer upstanding flange and an inner concentric depending flange, said outer flange having a flat horizontal top surface, a disk-like cover member provided with an annular depending flange having a horizontal flat bottom surface to mate with and be supported by the flat upper face of said upstanding flange, means to detachably clamp together said cover and collector, said cover being provided with an upstanding cylindrically shaped central chute wherethrough to introduce frozen cubes of ice to the machine, an ice crusher blade carried by the first said disk member and extending diametrically across and projecting upwardly into the circular space defined by the inner periphery of said chute, means carried by the inner periphery of said chute and cooperating with said blade to restrict the spinning of the ice cube while said blade is performing a crushing action upon the ice incident to its passing into the machine, and mechanical means mounted within the machine to centrifuge the substance after being crushed by said crushing means.

9. In a machine of the kind described, supporting means, a disk-like member mounted upon said supporting means to rotate thereon, a second disk-like member mounted upon said supporting means, said second member being positioned in a concentric parallel superjacent relation to the first said disk-like member with their faces adjacent, each of said members being provided with a multiplicity of teeth on their adjacent faces, the teeth of each of said members being arranged in concentric circular rows, the teeth of each member projecting into spaces provided for them between the concentric rows of teeth of the other member, the teeth of each member being staggered circumferentially in adjacent rows, a chute centrally carried by said second member through which to introduce cubes of frozen foods to be liquefied by centrifuging while passing through the multiplicity of teeth of said members, said chute terminating at its lower end in a castellated flange through the openings of which the disintegrated ice particles pass after being crushed, curcumferentially spaced, vertically extending square-shouldered ribs mounted in the inner periphery of said chute to aid in maintaining a hold on the cubes to prevent their premature rotation while they are undergoing disintegration, and means carried centrally of the first said disk-like member to crush said cubes while they are being held against rotation by said ribs.

10. The subject matter of claim 1 and, said feed chute being circular and terminating at its lower end in a castellated flange through the openings of which the disintegrated ice particles pass incident to their passage between said rows of teeth, and said blade having leading cutting and trailing edges which operate with a working clearance within the annular space defined by the inner periphery of said castellated flange.

11. The subject matter of claim 1 and, said blade having leading cutting and trailing edges, the leading edges of said blade being continuations of the trailing edges thereof and extending only half the distance of the length of said blade.

12. The subject matter of claim 1 and, said blade having leading cutting and trailing edges, the leading edges of said blade facing in opposite directions and each extending only half the length of said blade.

13. The subject matter of claim 1 and, said blade having leading cutting and trailing edges, the leading edges of said blade facing in opposite directions at points intermediate the blade's ends.

14. The subject matter of claim 6, and stationary insulated electrical means carried by the machine enveloping said inclined sump throughout the greater portion of the circumference of the casing to heat the substance passing through the machine.

DAVID O. BRANT.

REFERENCES CITED

The following references are of record in the file of this patent:

UNITED STATES PATENTS

| Number | Name | Date |
| --- | --- | --- |
| 8,670 | Blasdell | Jan. 20, 1852 |
| 736,657 | Whitman | Aug. 18, 1903 |
| 901,217 | Touya, Jr. | Oct. 13, 1908 |
| 1,764,760 | Soule | June 17, 1930 |
| 1,766,447 | Moir | June 24, 1930 |
| 1,940,353 | Jenkins | Dec. 19, 1933 |
| 2,166,351 | Hagen | July 18, 1939 |
| 2,211,518 | Scherbaum | Aug. 13, 1940 |
| 2,296,564 | Morehouse | Sept. 22, 1942 |
| 2,328,952 | Brant | Sept. 7, 1943 |
| 2,373,682 | Hodson | Apr. 17, 1945 |